United States Patent
Peterson et al.

(10) Patent No.: US 10,944,858 B2
(45) Date of Patent: Mar. 9, 2021

(54) DISPLAY OF PROPERTY RESTRICTIONS VIA WIRELESS DEVICE

(71) Applicant: Lenovo (Singapore) Pte. Ltd., Singapore (SG)

(72) Inventors: Nathan J. Peterson, Durham, NC (US); Russell Speight VanBlon, Raleigh, NC (US); Rod D Waltermann, Rougemont, NC (US); Arnold S. Weksler, Raleigh, NC (US); John Carl Mese, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/377,699

(22) Filed: Dec. 13, 2016

(65) Prior Publication Data
US 2018/0167501 A1    Jun. 14, 2018

(51) Int. Cl.
*H04M 1/725* (2006.01)
*H04W 4/021* (2018.01)
*H04W 4/33* (2018.01)
*H04L 29/06* (2006.01)

(52) U.S. Cl.
CPC ... *H04M 1/72569* (2013.01); *H04M 1/72572* (2013.01); *H04W 4/021* (2013.01); *H04W 4/33* (2018.02); *H04L 67/38* (2013.01); *H04M 1/72544* (2013.01); *H04M 1/72566* (2013.01)

(58) Field of Classification Search
CPC .... H04M 1/72569; H04W 4/021; H04W 4/04
USPC ...................... 455/418, 421, 410, 456.4, 411
See application file for complete search history.

(56) References Cited

U.S. PATENT DOCUMENTS

| | | | | |
|---|---|---|---|---|
| 8,275,640 B2* | 9/2012 | Jayaram | ................ | G06Q 40/08 705/4 |
| 2007/0259658 A1* | 11/2007 | Bihya | ................ | H04W 8/245 455/422.1 |
| 2010/0127821 A1* | 5/2010 | Jones | ................ | G07C 9/00309 340/5.2 |
| 2010/0255858 A1* | 10/2010 | Juhasz | ................ | H04W 48/02 455/456.4 |
| 2012/0102549 A1* | 4/2012 | Mazzaferri | ......... | G06F 21/6218 726/4 |
| 2014/0073421 A1* | 3/2014 | Abbott | ................ | G07F 17/32 463/29 |
| 2016/0055692 A1* | 2/2016 | Trani | ................ | G07C 9/00007 340/5.61 |
| 2016/0055697 A1* | 2/2016 | Raina | ................ | G07C 9/00111 340/5.7 |
| 2016/0055698 A1* | 2/2016 | Gudmundsson | ... | G07C 9/00142 340/5.52 |
| 2016/0140868 A1* | 5/2016 | Lovett | ................ | G09B 19/0053 434/118 |

* cited by examiner

*Primary Examiner* — Nghi H Ly
(74) *Attorney, Agent, or Firm* — Schwegman Lundberg & Woessner, P.A.

(57) ABSTRACT

A computer implemented method include detecting a location of a wireless device, receiving an identification of a property proximate the detected location, receiving an associated property restriction as a function of the detected location of the device, applying an indication of the restriction to the property, and providing a display indicating the property and the associated restriction via the device.

20 Claims, 4 Drawing Sheets

| | 310 | 315 | 320 | 325 | 330 | 335 | 340 |
|---|---|---|---|---|---|---|---|
| | LOCATION | TENANT | RESTRICTION | TIMES | USER | CODE | ... |
| 345 | BANK | A | Y | 0900 - 1700 | 1 | — | ... |
| 350 | COFFEE | B | Y | 0500 - 2300 | 1 | 234 | ... |
| | ⋮ | | | | | | |
| 355 | PARK | F | N | — | 1 | — | ... |

DISPLAY OF PROPERTY RESTRICTIONS VIA WIRELESS DEVICE

BACKGROUND

Wireless devices have enabled the development of games and other applications that lead users into the great outdoors. Various mapping applications are currently available to lead users through properties that are owned by different entities. While such entities may post physical signs regarding access to their properties, such signs are easily ignored or missed by a user focusing on a display provided by their wireless device.

SUMMARY

A computer implemented method include detecting a location of a wireless device, receiving an identification of a property proximate the detected location, receiving an associated property restriction as a function of the detected location of the device, applying an indication of the restriction to the property, and providing a display indicating the property and the associated restriction via the device.

A computing device includes a processor and a memory device coupled to the processor having instructions stored thereon. The instructions are executable by the processor to detect a location of a wireless device, receive an identification of a property proximate the detected location, receive an associated property restriction as a function of the detected location of the device, apply an indication of the restriction to the property, and provide a display indicating the property and the associated restriction via the device.

A machine readable storage device that is not a transitory signal, having instructions that are executable by a processor to perform operations. The operations include detecting a location of a wireless device, receiving an identification of a property proximate the detected location, receiving an associated property restriction as a function of the detected location of the device, applying an indication of the restriction to the property, and providing a display indicating the property and the associated restriction via the device.

DETAILED DESCRIPTION

Figure 1:
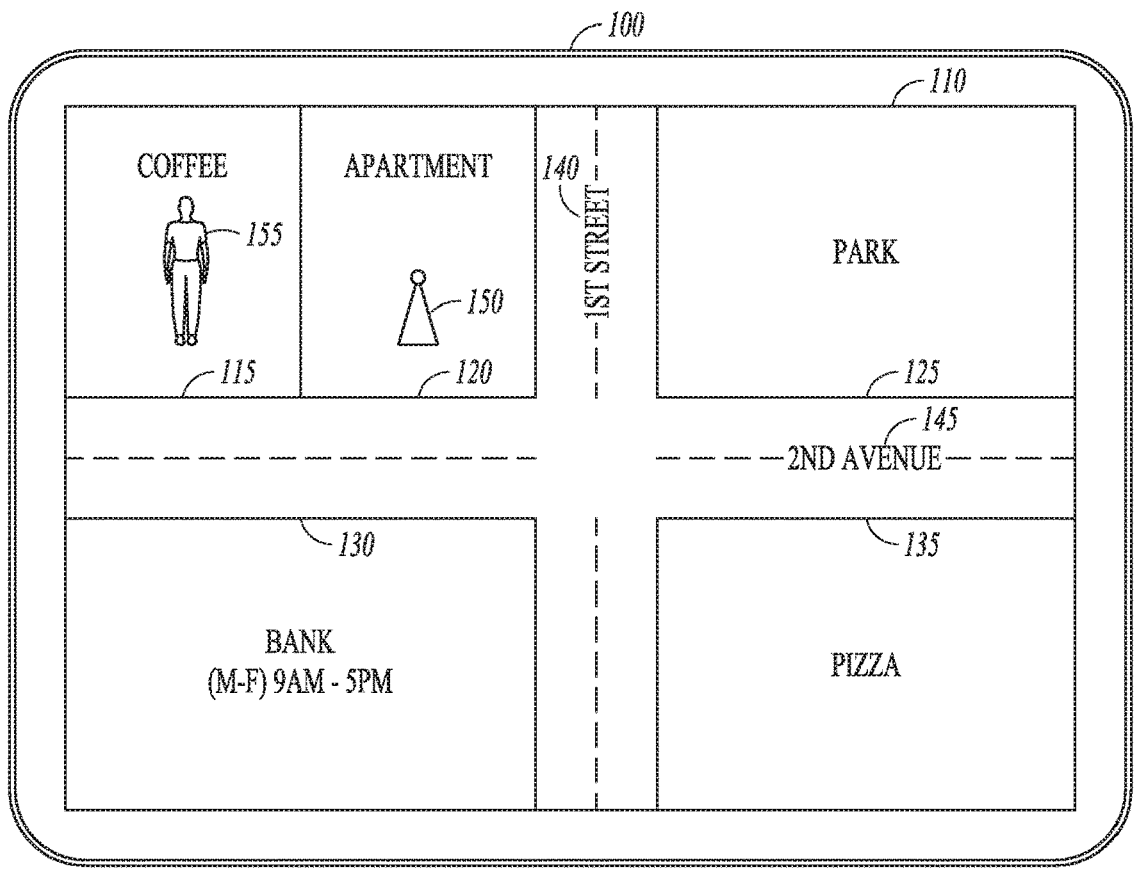
FIG. 1 is a block diagram of a device such as a cell phone, tablet, virtual reality or augmented reality headset, or other device that may be used by a user to display information about proximate properties on a display according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A device provides an augmented reality view of multiple properties to a user of the device based on location of the device and accesses restrictions associated with the properties. The device provides a display that shows a view of the properties with one or more attributes representative of the restrictions, such as an indication representative of a no-trespassing restriction. The attributes may include a property line having a different color or other type of attribute, such as blinking or highlighting, and may also include text. The text may indicate hours during which access to the property may be allowed, such as during normal business hours where the property is a business.

In some embodiments, the restrictions may be varied for different users, such as identified by a distribution list or social media group, permitting access to those users in the list or group. In still further embodiments, the attributes indicating a restriction for a property may take the form of an audible notification played by the device if the device enters the property, such as a beep or other sound, or a verbal notification such as "Warning, you have entered a restricted property."

In further embodiments, access may be permitted based on a transaction conducted by the user at the property, and may be enabled by entry of a code provided by a tenant of the property or a communication identifying the transaction and associating it with the property and user. A tenant may be an owner of the property, a person leasing the property, or some other entity authorized to permit access to the property.

FIG. 1 is a block diagram of a device 100, such as a cell phone, tablet, virtual reality or augmented reality headset, or other device that may be used by a user to display information about proximate properties on a display 110. The device 100 may have a processor and other circuitry for wireless communications and global positioning or other location sensing capabilities. In various embodiments, the device 100 may be used for navigation using commonly available mapping applications, such as Google Maps, Waze, or other applications, or may be used for virtual reality games, such as Pokemon or even geocaching. Many such applications provide property boundary indications which may be displayed as lines indicating property boundaries, as well as roads and other information which may be used either as a representation of the properties, or as an augmented view of a property in a current proximity of the device being used by the user.

A simple example of a map is shown on the display 110 in FIG. 1, with several property boundaries displayed. A property corresponding to a coffee business is indicated with boundary 115, an apartment with boundary 120, a park with boundary 125, a bank with boundary 130, and a pizza establishment with boundary 135. A first road is labeled as $1^{st}$ Street at 140 and a second road is indicated as $2^{nd}$ Avenue 145.

In one embodiment, the device 100 displays boundaries of properties with associated restrictions as a line having a different attribute, such as red or other color, bold, highlight, blinking, or other attribute. In the example shown in FIG. 2, line 120 corresponding to the apartment building, is shown in bold, thicker and darker than other property lines. The attribute is representative of a no-trespassing indication, indicating the tenant of the property does not desire users to access the property. The attribute in some embodiments may be application specific, such as only corresponding to a user playing a game on their device 100.

Property line 130 corresponding to the bank, may or may not have an attribute. For instance, the bank has business hours of 9 AM to 5 PM, and the current time is within those business hours. The business hours may or may not be posted in the property representation displayed. Outside of those business hours, the property line 130 may be provided with a no-trespassing attribute. In further embodiments, a different property line attribute may be used during normal business hours, such as green, indicating that there are temporal restrictions (after business hours) associated with the property, but the current time is outside of such temporal restrictions, so access is not prohibited.

In one embodiment, a beacon 150 may be used to identify property restrictions. The beacon may respond wirelessly with the restriction information when queried by a device 100, such as via near field communications, Bluetooth, radio frequency tab type interrogation, or may simply periodically broadcast the restriction information. In further embodiments, tenants of various properties may register the restrictions with one or more applications or even with a geologic property database that is accessed by the one or more applications such that restrictions may be available for multiple applications with a single registration.

One example of an augmented reality virtual figure that may be part of a game is shown at 155. Such a game may be related to finding and collecting such figures. Certain properties may wish to avoid having users cut through their properties to obtain such figures, or may wish to limit which users may enter their property during business hours. Users may be limited to known customers, social media followers, or customers having made recent purchases in various embodiments. Recent purchases may be identified by providing a code on a paper or electronic receipt, and allowing entry of the code to change a default no-trespassing restriction to an access allowed indication, which may be simply the absence of an attribute indicating a restriction, or a green attribute. Until the code or other indication is provided, an attribute may, in the case of a virtual reality game or other game, simply indicate that the user is not yet authorized to play the game at that property. Upon entry or other receipt of the code, the displayed restriction may be modified to be indicative of granting permission to the user to play a game within the property.

Figure 2:
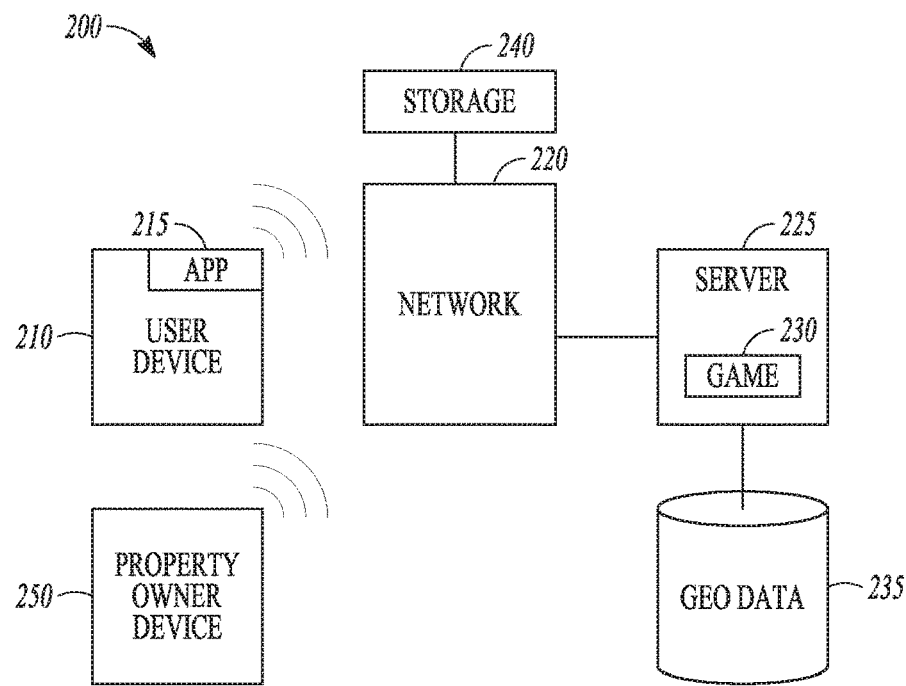
FIG. 2 is a block diagram illustrating a system that includes a user device running an app or application to provide a user with views of property proximate that device according to an example embodiment.

FIG. 2 is a block diagram illustrating a system 200 that includes a user device 210 running an app or application 215 to provide a user with views of property proximate that device. Properties proximate the device include properties near a user on foot or in an automobile such as may be reachable at respective rates of speed within a few minutes in one embodiment. Proximate may also include properties within a view selectable by a user. For instance, a user may zoom in and out on a current view to show more or fewer properties for a given view. Proximate may include properties for which boundaries may be displayed given the resolution and viewability of the screen by a user. If the user has zoomed out too far, the property boundaries may be too small to be of use.

In one embodiment, the device 210 has wireless capabilities to communicate via a network 220 to a server or host 225 that may be hosting an application, such as directions or mapping service or game 230 that the user is playing. Thus, the game may have components in the app 215 and server 225 to provide the view of properties proximate the user. In one embodiment the server access geological survey data 235 to obtain property boundary information. The server 225 may also then access restrictions that are associated with each property, stored either in database 235, locally at the serer 225, or via network accessible storage 240, such as cloud storage. The access restrictions may be unique to the application 230, or may be applicable to multiple different applications in various embodiments. A property tenant device 250 may be used to access the storage having the restrictions for their property to set and modify the restrictions.

In further embodiments, the attributes indicating a restriction for a property may take the form of an audible notification played by the device 210 if the device 210 enters the property, such as a beep or other sound, or a verbal notification such as "Warning, you have entered a restricted property." The language or sound used for audible notifications may also be selected via the tenant device 250 and may be tailored for each property.

Figures 3, 4:
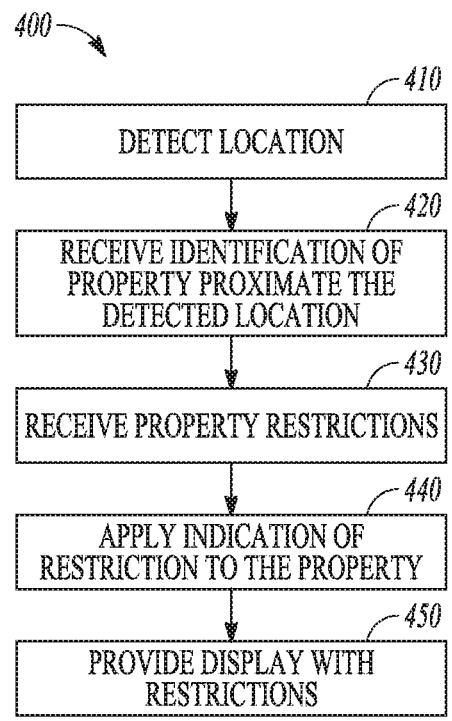
FIG. 3 is a representation of a data structure that associates restrictions and constraints with properties according to an example embodiment.
FIG. 4 is a flowchart illustrating a method of displaying property access restrictions according to an example embodiment.

FIG. 3 is a representation of a data structure 300 that associates restrictions with properties. While data structure 300 is shown as a table with rows and columns, it should be understood that the data may be stored in a relational form in one or more different databases, as relational data or object based data, or other forms such that the data is accessible and relates restrictions to properties. The columns of data structure 300 in one embodiment, include a location 310, owner or tenant 315, restrictions 320, times 325, users 330, codes 335, and other restrictions 340 that may be applicable to the property. The other restrictions 340 may include an identification of an audible notification.

In one embodiment, the locations 310 may be specified as a series of geo-spatial coordinates, such as latitude and longitude, and optionally height, identifying boundaries of corresponding properties. Such locations are already utilized by many mapping applications to display property boundaries by lines. Multiple locations are listed, corresponding to some of the locations in the view of FIG. 1, including a bank 345, coffee shop 350, and park 355.

The tenant 315 as indicated above may be the actual owner of the property or a tenant of the property, or anyone authorized to control access to the property. Restrictions 320 may include a simple yes or no indication, such as "1" or a "0", or a multiple bit representation of whether the restrictions are subject to further constraints. Further constraints on the restrictions may be provided as times 325, user IDs 330, codes 335, or other restrictions 340. Codes may be generated corresponding to purchases by a user, and may identify whether or not the user may access the property.

Bank 345 is indicated as having restrictions in column 320. One restriction is a range of hours when access is permitted at 325. Coffee shop 350 has a different range of hours and has a code indicated in column 335 provided due to a recent purchase the user. Note that the user in the data structure 300 is the same user as the user of the device for ease of representation. Further users may be identified in other versions of the data structure 300. Park 355 is indicated has having no restrictions, and thus, the boundary in FIG. 1 is not provided with an attribute.

FIG. 4 is a flowchart illustrating a method 400 of displaying property access restrictions according to an example embodiment. The method 400 in one embodiment may be implemented on a mobile device with wireless communication capabilities. At 410, the mobile device detects its location via global position system capabilities, or using triangulation capabilities based on cellular base stations or other wireless devices within range. The detected location is used to obtain identifications at 420 of properties nearby or proximate to the device. Restrictions associated with the properties are also received or otherwise obtained at 430. At 440, the device applies indications or restrictions to the property, such as an attribute of lines corresponding to the boundaries of the property. At 450, the property lines with attributes are shown such that the attributes communicate restrictions to accessing the properties that may be applicable.

In some embodiments, the display may be in the form of an augmented reality view of a property line of the property with the associated restriction. The associated restriction may be displayed as a no trespassing indication or attribute. The associated restriction may include a restriction dependent on time of day. The associated restriction may also be dependent on an identification of a user identified by the device, such as a list of users, or a group of users identified by a social media application. The associated restriction may also be correlated with business hours of the property and may further be based on an indication of a transaction conducted by a user of the device associated with the identified property.

In some embodiments, the received indication of the property is received from a wireless tag placed proximate the property, such as a beacon set up by a property tenant that may also include one or more of the previously mentioned constraints.

Figure 5:
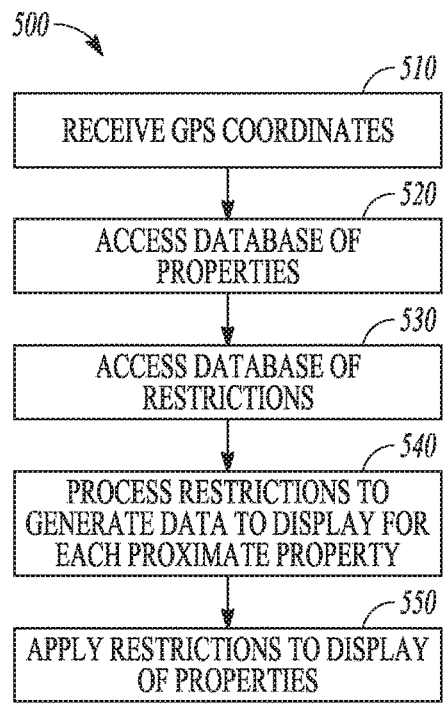
FIG. 5 is flowchart representation of a method associating restrictions with properties according to an example embodiment.

FIG. 5 is flowchart representation of a method 500 associating restrictions with properties according to an example embodiment. At 510, GPS coordinates are received. A database containing properties proximate the coordinates are retrieved at 520. The properties that are proximate the coordinates identified based on a current view of an area being displayed. If the user has a fairly zoomed in view, a few to one property lines may be identified. Based on the identified properties and property lines, a database of restrictions corresponding to the identified properties is accessed at 530. The restrictions may be in a same database or a different database as the properties database in different embodiments. The restrictions are retrieved and then processed at 540 to generate data to display for each proximate property. Processing may include retrieving triangle based sets of coordinates to draw the property boundaries on the display and adding attributes to the boundary lines corresponding to the restrictions. Further constraints may be used to determine the appropriate attributes based on time of day and temporal restrictions, user based attributes and code based attributes in various embodiments. The restrictions and attributes are then applied to display the property lines.

Figure 6:
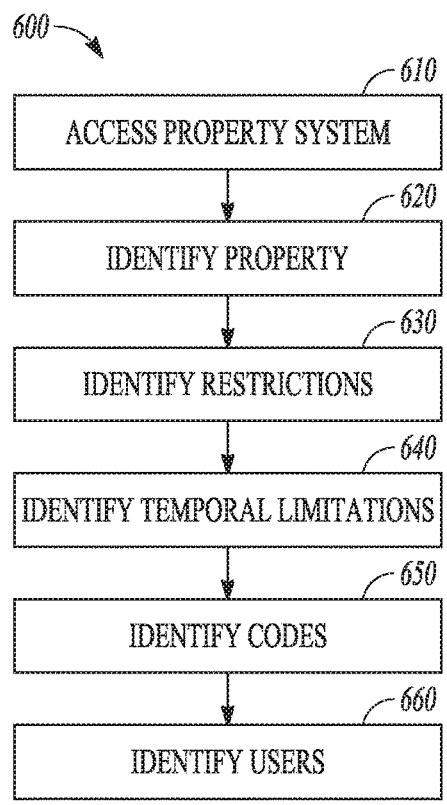
FIG. 6 is a flowchart representation of a method for tenants of properties to identify, set, and modify restrictions and constraints for their properties according to an example embodiment.

FIG. 6 is a flowchart representation of a method 600 for tenants of properties to identify, set, and modify restrictions and constraints for their properties. In one embodiment, the tenant may use a tenant networked connected device to access a database of property descriptions and corresponding restrictions at 610. The tenant may access a server that manages the database, or a server that provides resources for execution of one or more applications that use the database to provide services to user devices to display property restrictions. At 620, the tenant may identify the property. This may be done by accessing the property based on current location GPS coordinates and certifying that they have the rights to control access to the database in some embodiments. Restrictions may be identified at 630, such as selection by a menu of restrictions. Constraints, such as temporal limitations may similarly be identified at 640 as a constraint. Codes may also be similarly identified at 650, and users allowed to access the property may be identified by providing a distribution list or other list of users, such as social media groups at 660. The tenant may access the system to further modify or provide additional constraints.

Figure 7:
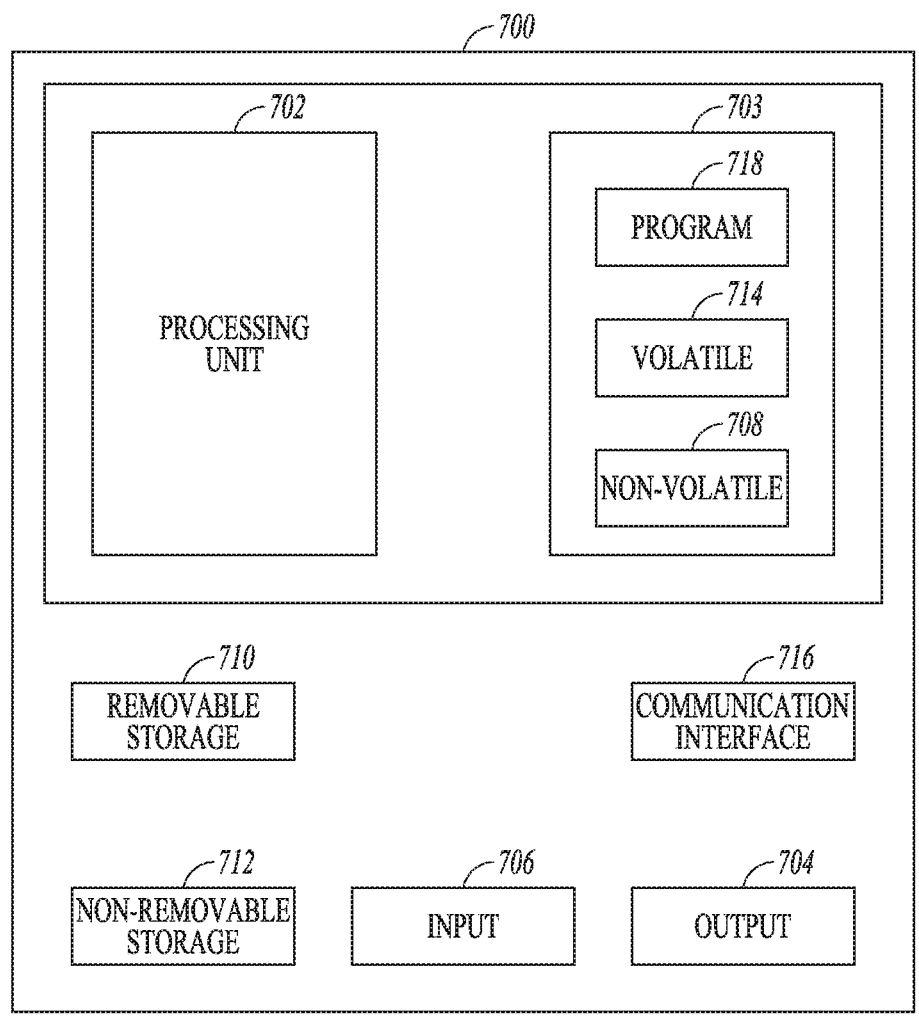
FIG. 7 is a block diagram of computer system used to implement methods according to an example embodiment.

FIG. 7 is a block schematic diagram of a computer system 700 to implement device 100 and other computing resources according to example embodiments. All components need not be used in various embodiments. One example computing device in the form of a computer 700, may include a processing unit 702, memory 703, removable storage 710, and non-removable storage 712. Sensors 115 and 125 may be coupled to provide data to the processing unit 702. Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. Output 704 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, DRAM, and RAM are some examples of data storage devices including a non-transitory computer-readable medium. For example, a computer program 718 may be used to cause processing unit 702 to perform one or more methods or algorithms described herein. Computer program 718 may be stored on a device or may be downloaded from a server to a device over a network such as the Internet. Computer-readable instructions may also be included on a computer readable storage medium that is being vended and/or provided, where the computer readable storage medium is defined as not encompassing a transitory signal, carrier wave, and/or a signal per se.

EXAMPLES

In example 1, a computer implemented method includes detecting a location of a wireless device, receiving an identification of a property proximate the detected location, receiving an associated property restriction as a function of the detected location of the device, applying an indication of the restriction to the property, and providing a display indicating the property and the associated restriction via the device.

Example 2 includes the computer implemented method of example 1 wherein the display provides an augmented reality view of a property line of the property with the associated restriction.

Example 3 includes the computer implemented method of any of examples 1-2 wherein the associated restriction is displayed as a no trespassing indication.

Example 4 includes the computer implemented method of any of examples 1-3 wherein the associated restriction comprises a restriction dependent on time of day.

Example 5 includes the computer implemented method of any of examples 1-4 wherein the associated restriction is dependent on an identification of a user identified by the device.

Example 6 includes the computer implemented method of example 5 wherein the associated restriction is dependent upon a list of users.

Example 7 includes the computer implemented method of any of examples 1-6 wherein the associated restriction is correlated with business hours of the property.

Example 8 includes the computer implemented method of any of examples 1-7 and further includes receiving an indication of a transaction conducted by a user of the device associated with the identified property and modifying the displayed restriction to be indicative of granting permission to the user to play a game within the property.

Example 9 includes the computer implemented method of any of examples 1-8 wherein the received indication of the property is received from a wireless tag placed proximate the property.

Example 10 includes the computer implemented method of any of examples 1-9 wherein the associated property restriction is provided via an authorized tenant of the property.

In example 11, a computing device includes a processor and a memory device coupled to the processor having instructions stored thereon. The instructions are executable by the processor to detect a location of a wireless device, receive an identification of a property proximate the detected location, receive an associated property restriction as a function of the detected location of the device, apply an indication of the restriction to the property, and provide a display indicating the property and the associated restriction via the device.

Example 12 includes the computing device of example 11 wherein the display provides an augmented reality view of a property line of the property with the associated restriction.

Example 13 includes the computing device of any of examples 11-12 wherein the associated restriction is displayed as a no trespassing indication.

Example 14 includes the computing device of any of examples 11-13 wherein the associated restriction comprises a restriction dependent on time of day.

Example 15 includes the computing device of example 14 wherein the associated restriction is dependent upon a list of users.

Example 16 includes the computing device of any of examples 11-15 wherein the associated restriction is correlated with business hours of the property, and wherein the operations further include receiving an indication of a transaction conducted by a user of the device associated with the identified property, and modifying the displayed restriction to be indicative of granting permission to the user to play a game within the property.

In example 17 a machine readable storage device that is not a transitory signal, having instructions that are executable by a processor to perform operations. The operations include detecting a location of a wireless device, receiving an identification of a property proximate the detected location, receiving an associated property restriction as a function of the detected location of the device, applying an indication of the restriction to the property, and providing a display indicating the property and the associated restriction via the device.

Example 18 includes the machine readable storage device of example 17 wherein the display provides an augmented reality view of a property line of the property with the associated restriction, wherein the associated restriction is displayed as a no trespassing indication, and wherein the associated restriction comprises a restriction dependent on time of day.

Example 19 includes the machine readable storage device of any of examples 17-18 wherein the associated restriction is dependent upon a list of users.

Example 20 includes the machine readable storage device of any of examples 17-19 wherein the associated restriction is correlated with business hours of the property and wherein the operations further include receiving an indication of a transaction conducted by a user of the device associated with the identified property and modifying the displayed restriction to be indicative of granting permission to the user to play a game within the property.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving a location in the form of GPS coordinates of a mobile wireless device from the mobile wireless device at a remote computer;
   receiving an identification of a property proximate to the received location based on the received GPS coordinates;
   receiving an associated property entrance restriction as a function of the received location of the mobile wireless device, the associated property entrance restriction being identified based on a distribution list and a user identified by the mobile wireless device; and providing an augmented reality view of the property that includes one or more attributes representative of the associated restriction via the mobile wireless device, the one or more attributes being indicative of whether the associated property entrance restriction is a temporary restriction or an application-specific restriction.

2. The computer implemented method of claim 1 wherein the display provides an augmented reality view of a property line of the property with the associated restriction.

3. The computer implemented method of claim 1 wherein the associated restriction is displayed as a no trespassing indication and further comprises an audible notification.

4. The computer implemented method of claim 1 wherein the associated restriction comprises a restriction dependent on time of day.

5. The computer implemented method of claim 1 wherein the associated restriction is alternatively identified based on a social media group and the user identified by the mobile wireless device.

6. The computer implemented method of claim 1 wherein the associated restriction is correlated with business hours of the property.

7. The computer implemented method of claim 1 and further comprising:
receiving an indication of a transaction conducted by a user of the mobile wireless device associated with the identified property; and
modifying the displayed restriction to be indicative of granting permission to the user to play a game within the property.

8. The computer implemented method of claim 1 wherein the received indication of the property is received from a wireless tag placed proximate the property.

9. The computer implemented method of claim 1 wherein the user is permitted access to the property subject to the associated property restriction and the display indicating the property and the associated property restriction notifies the user of the restriction applied to the property.

10. The computer implemented method of claim 1, wherein the associated property entrance restriction is accessible in storage by a tenant device for setting or modifying the associated property entrance restriction, the tenant device being associated with a tenant of the property.

11. A computing device comprising:
a processor; and
a memory device coupled to the processor having instructions stored thereon executable by the processor to, at least:
receive a location in the form of GPS coordinates of a mobile wireless device from the mobile wireless device at a remote computer;
receive an identification of a property proximate to the received location based on the received GPS coordinates;
receive an associated property entrance restriction as a function of the received location of the mobile wireless device, the associated property entrance restriction being identified based on a distribution list and a user identified by the mobile wireless device; and
provide an augmented reality view of the property that includes one or more attributes representative of the associated restriction via the mobile wireless device, the one or more attributes being indicative of whether the associated property entrance restriction is a temporary restriction and whether the associated property entrance restriction is an application-specific restriction.

12. The computing device of claim 11 wherein the display provides an augmented reality view of a property line of the property with the associated restriction.

13. The computing device of claim 11 wherein the associated restriction is displayed as a no trespassing indication.

14. The computing device of claim 11 wherein the associated restriction comprises a restriction dependent on time of day.

15. The computing device of claim 14 wherein the associated restriction is alternatively identified based on a social media group and the user identified by the mobile wireless device.

16. The computing device of claim 11 wherein the associated restriction is correlated with business hours of the property, and wherein the operations further comprise:
receiving an indication of a transaction conducted by a user of the mobile wireless device associated with the identified property; and
modifying the displayed restriction to be indicative of granting permission to the user to play a game within the property.

17. A machine readable storage device that is not a transitory signal, having instructions that are executable by a processor to perform operations comprising:
receiving a location in the form of GPS coordinates of a mobile wireless device from the mobile wireless device at a remote computer;
receiving an identification of a property entrance proximate to the received location based on the received GPS coordinates;
receiving an associated property restriction as a function of the received location of the mobile wireless device, the associated property entrance restriction being identified based on a distribution list and a user identified by the mobile wireless device;
applying an indication of the restriction to the property; and
providing an augmented reality view of the property that includes one or more attributes representative of the associated restriction via the mobile wireless device, the one or more attributes being indicative of whether the associated property entrance restriction is a temporary restriction and whether the associated property entrance restriction is an application-specific restriction.

18. The machine readable storage device of claim 17 wherein the display provides an augmented reality view of a property line of the property with the associated restriction, wherein the associated restriction is displayed as a no trespassing indication, and wherein the associated restriction comprises a restriction dependent on time of day.

19. The machine readable storage device of claim 17 wherein the associated restriction is alternatively identified based on a social media group and the user identified by the mobile wireless device.

20. The machine readable storage device of claim 17 wherein the associated restriction is correlated with business hours of the property and wherein the operations further comprise:
receiving an indication of a transaction conducted by a user of the mobile wireless device associated with the identified property; and modifying the displayed restriction to be indicative of granting permission to the user to play a game within the property.

* * * * *